(12) United States Patent
Jeong et al.

(10) Patent No.: US 6,704,072 B2
(45) Date of Patent: Mar. 9, 2004

(54) FLAT PANEL DISPLAY DEVICE

(75) Inventors: Seok-Hong Jeong, Suwon (KR); Si-Hwan Kim, Gyeonggi-do (KR)

(73) Assignee: Samsung SDI Co., Ltd., Suwon (KR)

( * ) Notice: Subject to any disclaimer, the term of this patent is extended or adjusted under 35 U.S.C. 154(b) by 103 days.

(21) Appl. No.: 09/995,768

(22) Filed: Nov. 29, 2001

(65) Prior Publication Data

US 2002/0149730 A1 Oct. 17, 2002

(30) Foreign Application Priority Data

Feb. 27, 2001 (KR) .......................... 2001-10104

(51) Int. Cl.[7] .................. G02F 1/133; G02F 1/1337; G02F 1/1339
(52) U.S. Cl. .................. 349/73; 349/128; 349/158; 349/153; 359/82
(58) Field of Search .................. 349/73, 128, 158, 349/153; 359/82

(56) References Cited

U.S. PATENT DOCUMENTS 5,268,782 A * 12/1993 Wenz et al. .................. 359/81
6,166,797 A * 12/2000 Bruzzone et al. ........... 349/155
6,181,405 B1 * 1/2001 Izumi .......................... 349/153
6,373,547 B2 * 4/2002 Saito et al. .................. 349/155
6,525,799 B1 * 2/2003 Fukuda ....................... 349/157

FOREIGN PATENT DOCUMENTS

| JP | 04-020929 | 1/1992 | ......... G02F/1/1339 |
| JP | 05-072540 | 3/1993 | ......... G02F/1/1339 |
| JP | 11-064863 | 3/1999 | ......... G02F/1/1339 |
| JP | 2000-193942 | 7/2000 | ......... G02F/1/1333 |
| JP | 2000-298284 | 10/2000 | ......... G02F/1/1339 |

* cited by examiner

Primary Examiner—Eddie Lee
Assistant Examiner—Joseph Nguyen
(74) Attorney, Agent, or Firm—McGuireWoods LLP (57) ABSTRACT

A flat panel display device includes at least one display panel. The display panel includes a first substrate and a second substrate facing each other, and a sealant sealing the first substrate and the second substrate, wherein at least one of the first substrate and the second substrate has at least one protrusion portion formed on a portion of an inner surface thereof to adhere to the sealant.

24 Claims, 8 Drawing Sheets

FLAT PANEL DISPLAY DEVICE

BACKGROUND OF THE INVENTION

1. Field of the Invention

The present invention relates to a flat panel display device, and more particularly to a flat panel display device including at least one display panel.

2. Description of Related Art

In general, a flat panel display (FPD) device includes a liquid crystal display (LCD) device, an organic EL device, and so on. Such a FPD device has an advantage of a wider display area compared to other conventional display devices, such as a cathode ray tube (CRT).

Figure 1:
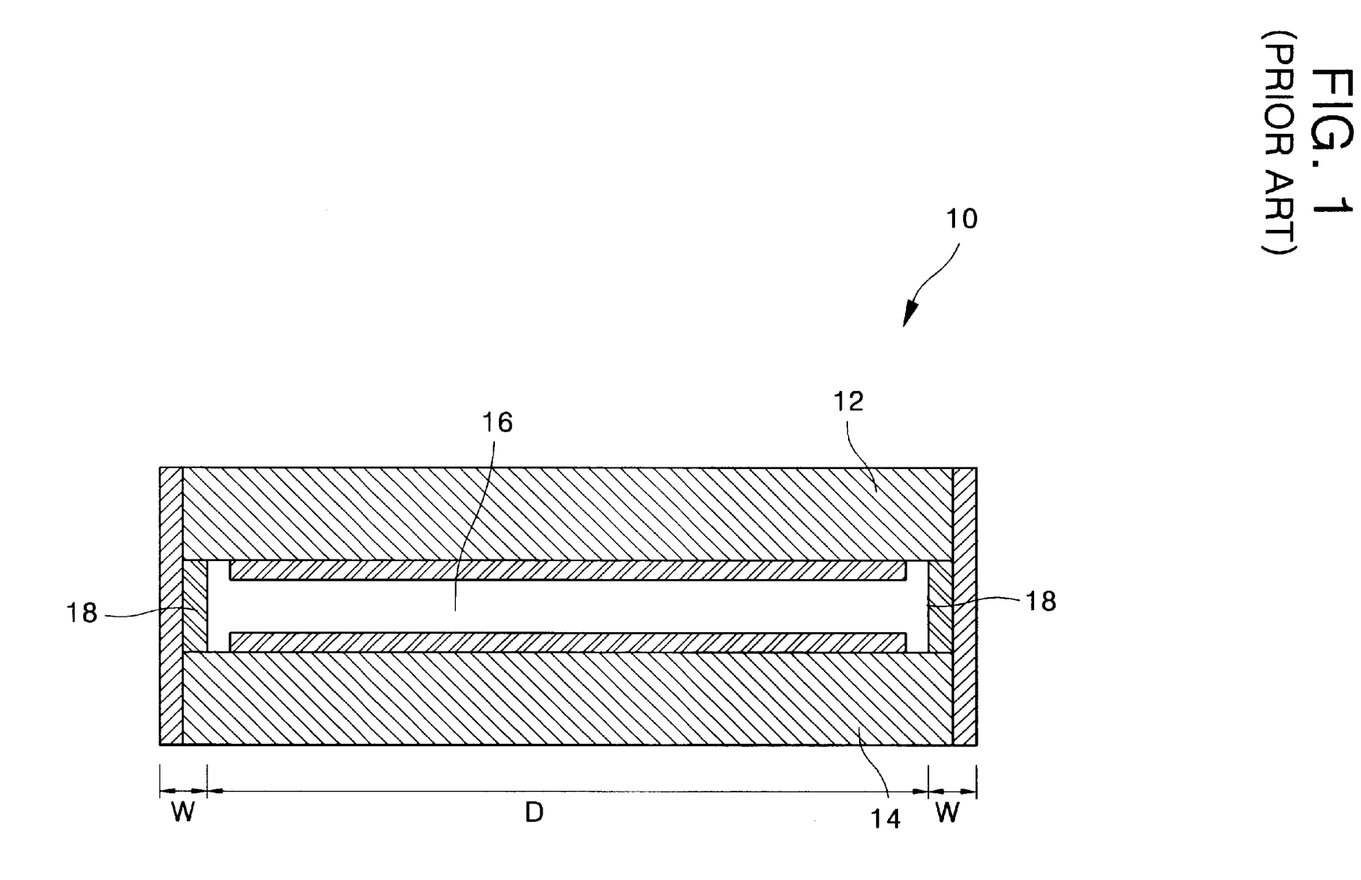
FIG. 1 is a cross-sectional view illustrating a conventional flat panel display device.

FIG. 1 is a cross-sectional view illustrating a conventional liquid crystal (LC) panel for use in the LCD device. Hereinafter, the FPD device is explained focusing on the LCD device.

As shown in FIG. 1, the LC panel 10 includes an upper substrate 12 and a lower substrate 14 with an LC layer 16 interposed therebetween. The upper substrate 12 includes color filters having R(red), G(green) and B(blue) pigments. The lower substrate 14 includes thin film transistors (TFTs) as a switching element. The upper substrate 12 and the lower substrate 14 are sealed by a sealant 18 to prevent the liquid crystal layer 16 from leaking.

Meanwhile, even though not shown, an organic EL device includes an upper substrate and a lower substrate. The lower substrate generally includes TFTs and an organic EL layer. The two substrates of the organic EL device are sealed by a sealant to prevent the organic EL layer from being damaged by external environment, such as oxygen, moisture or the like.

In such FPD devices, one solution to achieve the FPD device having a wide display area D is to narrow a width W of the sealant 18. However, such an approach may degrade the reliability of the sealant 18.

Figure 2:
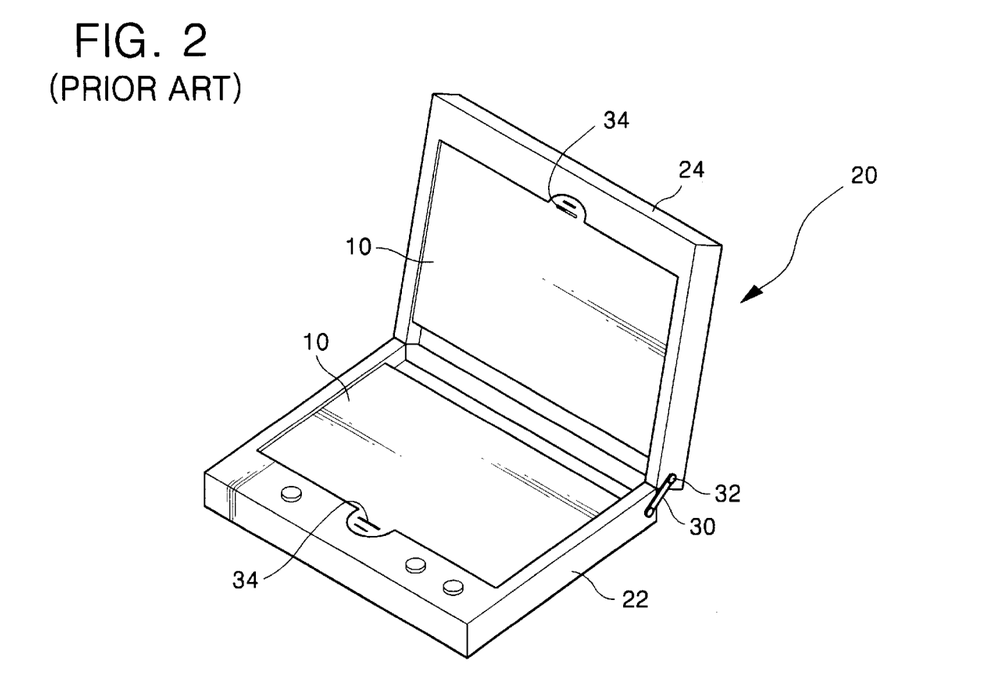
FIGS. 2 and 3 are perspective views illustrating a conventional flat panel display device having two display panels.
Figure 3:
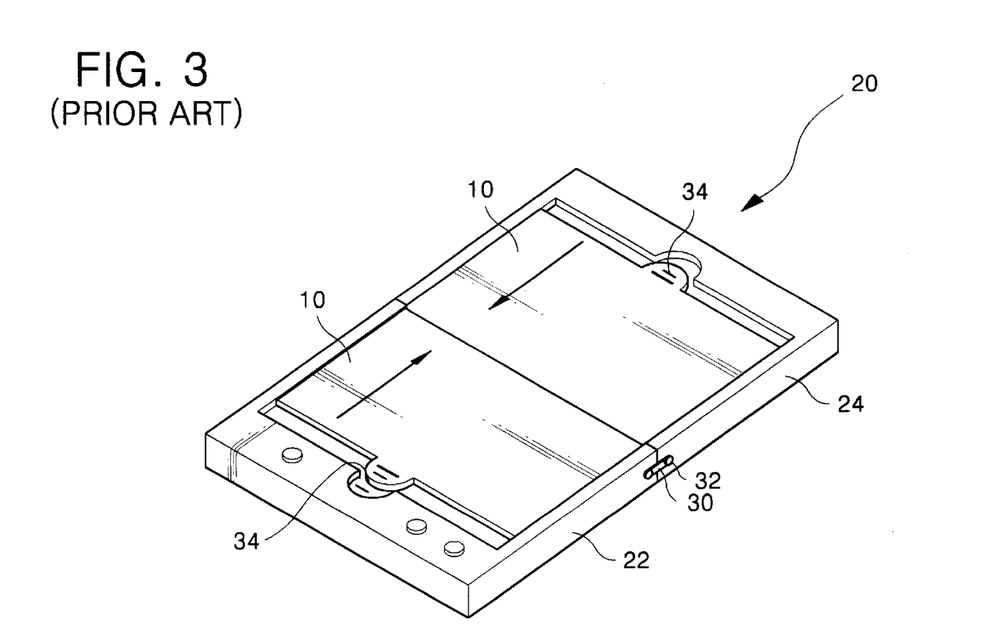

FIGS. 2 and 3 are perspective views illustrating a conventional flat panel display device having at least two display panels (i.e., multi-panel display device).

The multi-panel display device is designed to connect a plurality of display panels as shown in FIG. 1 to each other for a large-size display. Korean utility model publication No. 1999-14381 and Japanese patent publication No. 10-279672 disclose a technique that two display panels configure one display panel by minimizing a joint portion where two display panels are joined.

As shown in FIGS. 2 and 3, the portable multi-panel display device 20 includes a body 22, a case 24 and two display panels 10. Link members 30 are coupled to the body 22 and the case 24 through connection pins 32. The link members 30 are connected to the connection pins 32 and may rotate so that the case 24 can be folded or unfolded from the body 22.

When the body 22 and the case 24 are unfolded flatly as shown in FIG. 3, a user pushes the display panels 5 in arrow directions using pulling means 34 respectively, so that the two display panels 10 contact each other to configure one display screen.

The multi-panel display device described above should have the smallest possible joint portion between the two display panels in order to increase the one screen display effect. In this case, the one screen display effect refers to the ability of a plurality of display panels to appear to be one display screen. For the purpose of increasing the one screen display effect, a joint portion must be really narrow in width. Therefore, the sealant 18 having a small width must be formed. However, it may degrade the reliability of the sealant 18.

SUMMARY OF THE INVENTION

To overcome the problems described above, preferred embodiments of the present invention provide a flat panel display device having a wide display area.

It is another object of the present invention to provide a flat panel display device having at least two display panels that can increase one screen display effect.

It is a still another object of the present invention to provide a flat panel display device having excellent sealant reliability.

In order to achieve the above object, the preferred embodiments of the present invention provide a flat panel display device comprising at least one display panel. The display panel includes first and second substrates opposite to each other, and a sealant sealing the first and second substrates, wherein at least one of the first and second substrates has at least one protrusion portion formed on a portion of an inner surface thereof to adhere to the sealant.

The preferred embodiment of the present invention further pvovides a flat panel display device comprising: a plurality of display panels each including first and second substrates opposite to each other and a sealant sealing the first and second substrates, wherein the two adjacent display panels contact each other on a joint portion, and at least one of the first and second substrates of each of the two adjacent display panels has at least one protrusion portion formed on a portion of an inner surface thereof corresponding to the joint portion to adhere to the sealant.

The preferred embodiment of the present invention further provides a flat panel display device comprising: a plurality of display panels, the two adjacent display panels contacting each other on a joint portion, each of the plurality of the display panels including first and second substrates opposite to each other and first and second sealant, the first sealant sealing portions of the first and second substrates corresponding to the joint portion, the second sealant sealing the rest portions of the first and second substrates, wherein at least one of the first and second substrates has at least one protrusion portion formed on a portion of an inner surface thereof to adhere to the first sealant.

The sealant has a width of about 300 μm. The plurality of the protrusion portions have one of bar-type and dot-type shapes. A sum of a width of the protrusion portion and a distance between the two adjacent protrusion portion is less than 50 μm. The protrusion portion on the first substrate is formed at an opposite position of the protrusion portion on the second substrate. The protrusion portion on the first substrate is formed at a location corresponding to a gap between the two adjacent protrusion portions on the second substrate. The display panel further includes first and second electrodes respectively formed on an inner surface of the first and second substrates. The first and the second electrodes are made of the same material as the plurality of the protrusion portions.

The flat panel display device has the following advantages. Since a width of the sealant is reduced due to a plurality of protrusion portions, a flat panel display having a wide display area can be achieved without degrading sealant reliability. Since a width of the joint portion of the two display panels is reduced due to a high sealant reliability, the multi-panel display device having increased one screen display effect can be obtained.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts.

DETAILED DESCRIPTION OF PREFERRED EMBODIMENTS

Reference will now be made in detail to preferred embodiments of the present invention, example of which is illustrated in the accompanying drawings.

Figure 4:
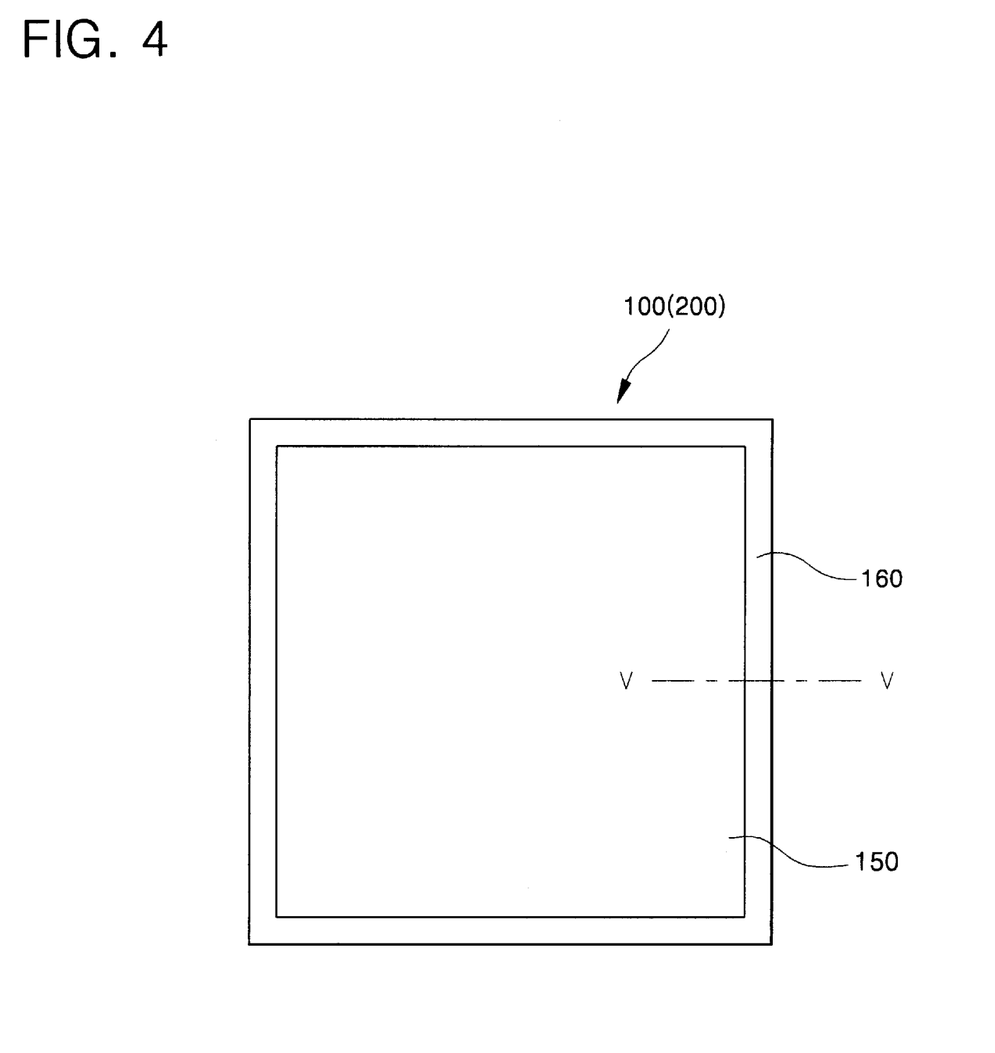
FIG. 4 is a plan view illustrating a FPD device according to a preferred embodiment of the present invention.
Figure 5:
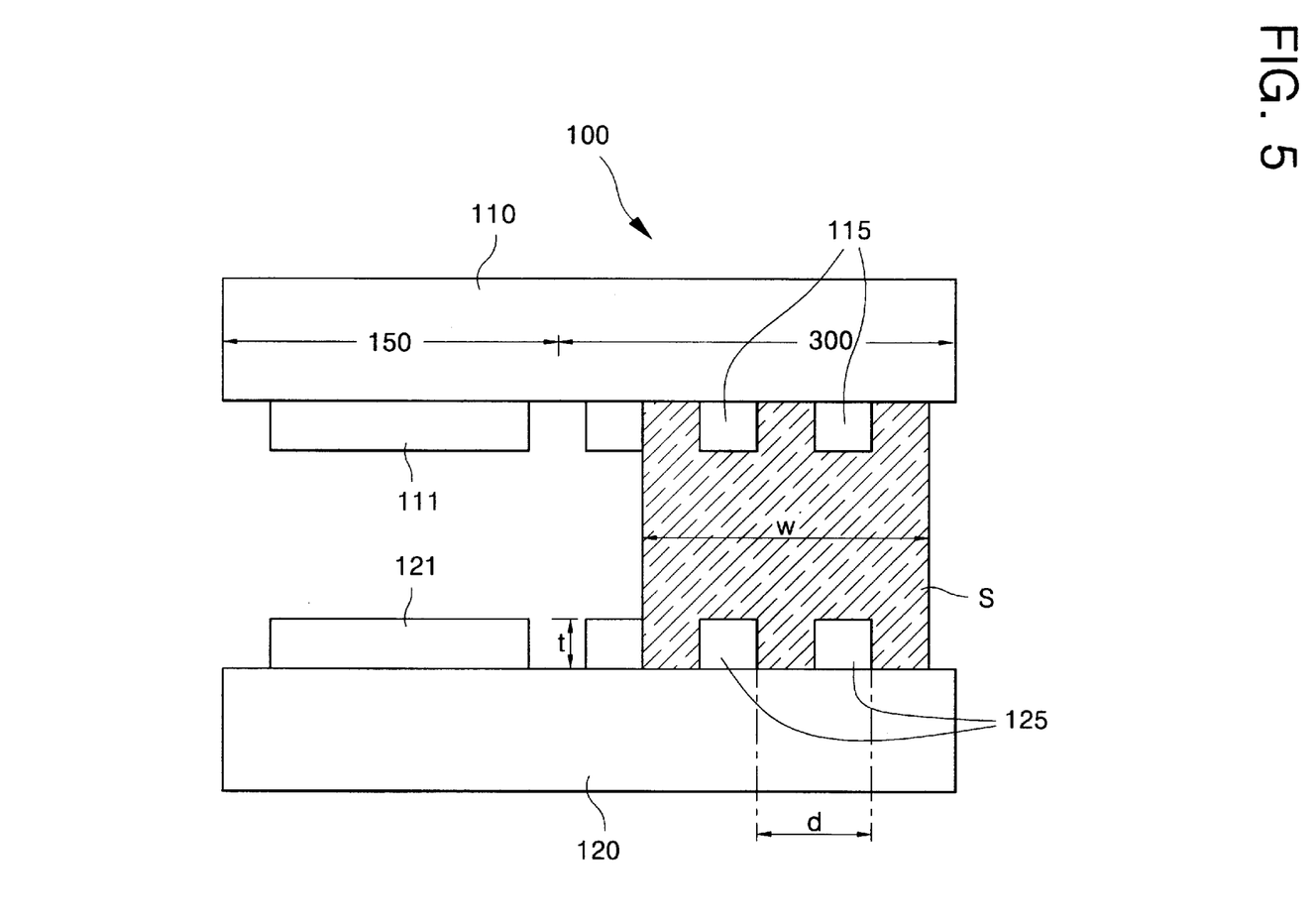
FIG. 5 is a cross-sectional view taken along line V—V of FIG. 4.

FIG. 4 is a plan view illustrating a FPD device according to the preferred embodiment of the present invention. FIG. 5 is a cross-sectional view taken along line V—V of FIG. 4.

The FPD device 100 includes an upper substrate 110 and a lower substrate 120. In the case that the FPD device is an LCD device, the upper substrate 110 includes a first electrode 111 and color filters having R(red), G(green) and B(blue) pigments, and the lower substrate 120 includes a second electrode 121 and switching w elements(e.g., TFTs). An LC layer is interposed between the two substrates 110 and 120. The upper and lower substrates 110 and 120 are sealed by a sealant S. If the FPD device is an organic EL device, the upper substrate 110 includes a first electrode 111, and the lower substrate includes a second electrode 121, switching elements (e.g., A TFTs) and an organic EL layer.

The first electrode 111 and the second electrode 121 are arranged on a display area 150 of the inner surfaces of the upper substrate 110 and the lower substrate 120. A plurality of protrusion portions 115 and 125 are arranged on a non-display area 160 of the inner surface of the upper and lower substrates 110 and 120. The protrusion portions 115 are preferably made of the same material as the first electrodes 111, and the protrusion portions 125 are preferably made of the same material as the second electrodes 121.

The protrusion portions 115 and 125 serve to increase a contact area to the sealant S, thereby increasing adhesive strength between the sealant S and the two substrates 110 and 120. Even though a width W of the sealant S becomes smaller, reliability of the first sealant S is not degraded, whereupon one screen display effect can be increased.

The protrusion portions 115 of the upper substrate 110 are formed at locations corresponding to the protrusion portions 125 of the lower substrate 120. However, the protrusion portions 115 of the upper substrate 110 can be formed at locations corresponding to a gap between the two protrusion portions 125 of the lower substrate 120.

The protrusion portions 115 and 125 can have various shapes, for example, a bar-type or a dot-type shape. Preferably, the protrusion portions 115 and 125 are formed at the same time as the electrode 111 and 121, respectively. Therefore, an additional process to form the protrusion portions 115 and 125 is not required.

Figure 6:
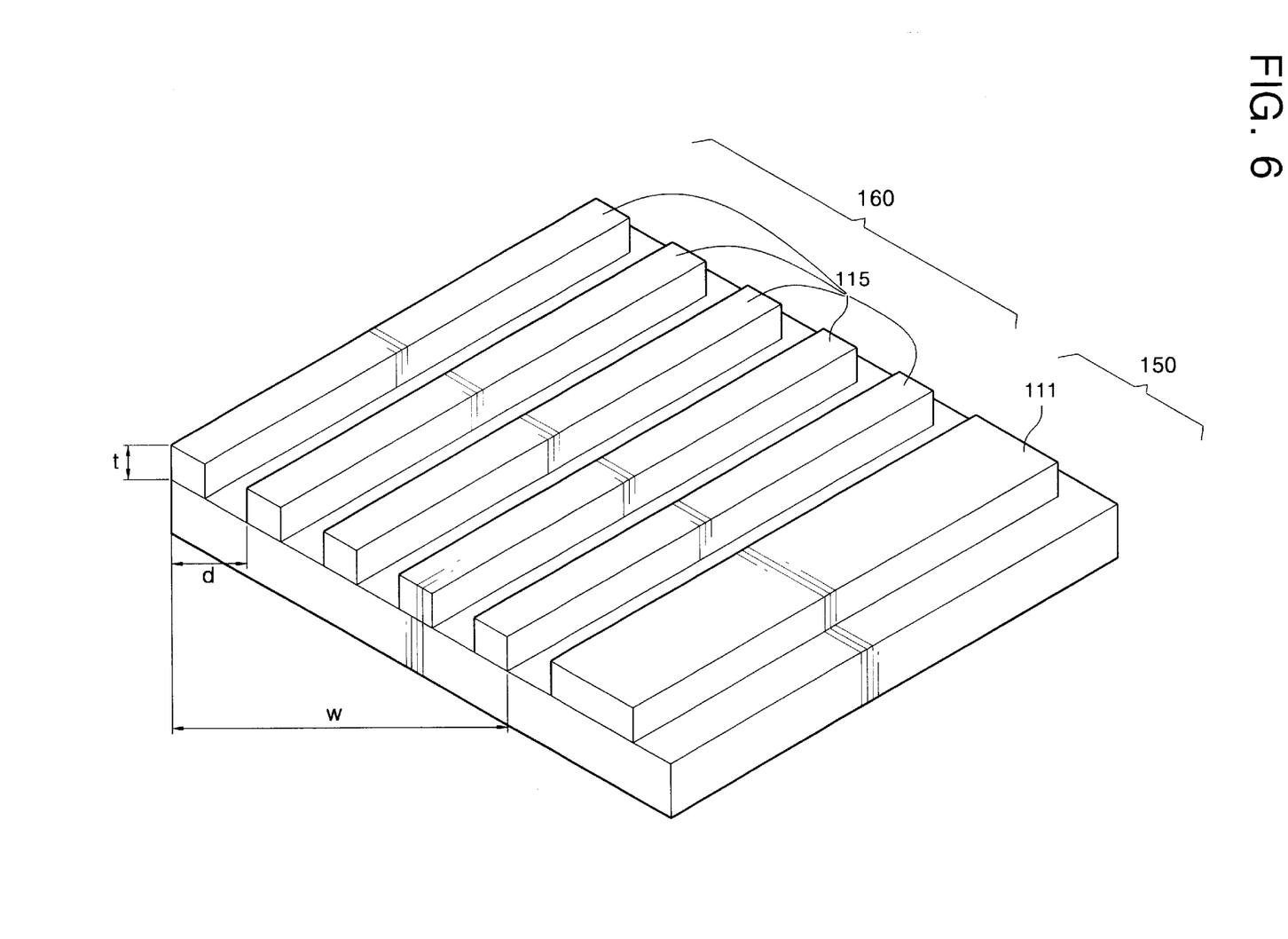
FIG. 6 is a perspective view illustrating one substrate of the flat panel display device of FIG. 5.

FIG. 6 is a perspective view illustrating one substrate (e.g., the upper substrate) of the flat panel display device of FIG. 5. As shown in FIG. 6, a plurality of the protrusion portions 115 are formed on the non-display area 160, and the electrode 111 is formed on the display area 150.

An experimentation is performed to examine an adhesive strength of the sealant with respect to a formation of the protrusion portions. Table 1 shows an adhesive strength according to a distance of the protrusion portion. At this point, a distance of the protrusion portion stands for a sum of a width of one protrusion portion and a gap between the two adjacent protrusion portions.

TABLE 1

| Distance of Protrusion portion | Adhesive Strength |
| --- | --- |
| 0 μm (no protrusion portion) | 1 kg/mm |
| 5 μm | 5 kg/mm |
| 15 μm | 3 kg/mm |
| 30 μm | 2 kg/mm |
| 50 μm | 1 kg/mm |

For the purpose of the experimentation shown in Table 1, a 10 Ω-indium tin oxide (ITO) glass available from Samsung Corning Co., Ltd., is used as a substrate, and an "XN-5A–C" available from Mitsui Toatu Chemicals, Inc., is used as the sealant. The protrusion portion is formed to a thickness (i.e., height "t") of 0.2 μm, As can be seen in Table 1, a distance of the protrusion portion is preferably less than 50 μm. A width of the sealant formed is as small as possible and preferably less than 0.3 mm (300 μm).

Assume that a height "t" of the protrusion portion is 0.2 μm, a width of the sealant is 300 μm, and 60 protrusion portions are formed. Each protrusion has an increased contact area of 0.4 μm(=0.2 μm×2). Therefore, a total increased contact area of the protrusion portions is 24 μm(0.4 μm×60). That is, due to 60 protrusion portions, the sealant comes to have 0.8% more contact area. Therefore, an adhesive strength between the sealant and the two substrates increases as much as that. Also, an adhesive strength is proportional to a surface roughness and thus increases by a formation of the protrusion portions.

Figure 7:
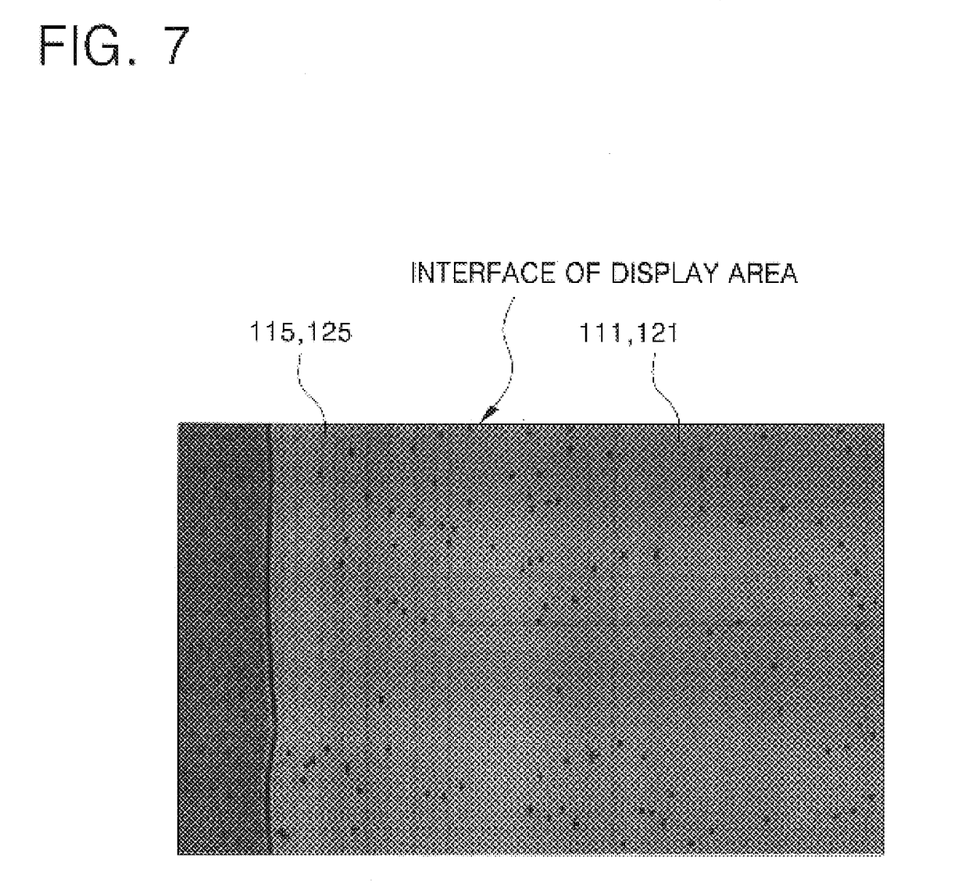
FIG. 7 is a photograph illustrating one substrate of the flat panel display device according to the preferred embodiment of the present invention.

FIG. 7 is a photograph illustrating one substrate of the flat panel display device according to the preferred embodiment of the present invention. The electrode 111 or 121 is formed on the display area, and a plurality of the bar-shaped protrusion portions 115 or 125 are formed on the non-display area.

As described above, due to the protrusion portions 115 and 125, respectively, formed in the non-display area of the upper and lower substrates 110 and 120, a contact area between the sealant S and the two substrates 110 and 120 increases, achieving a flat panel display device having a wide display area without degrading sealant reliability.

Figure 8:
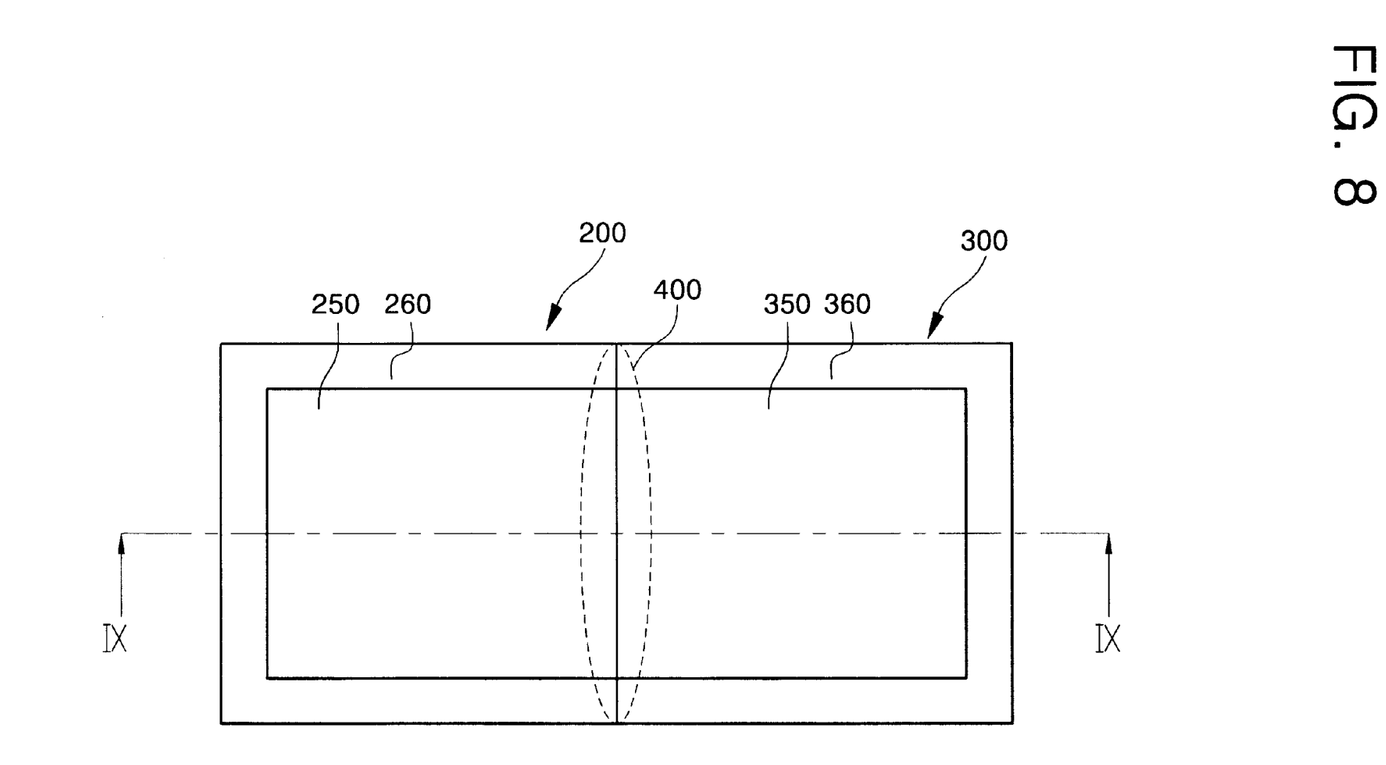
FIG. 8 is a plan view illustrating a flat panel display device including at least two display panels according to the preferred embodiment of the present invention.
Figure 9:
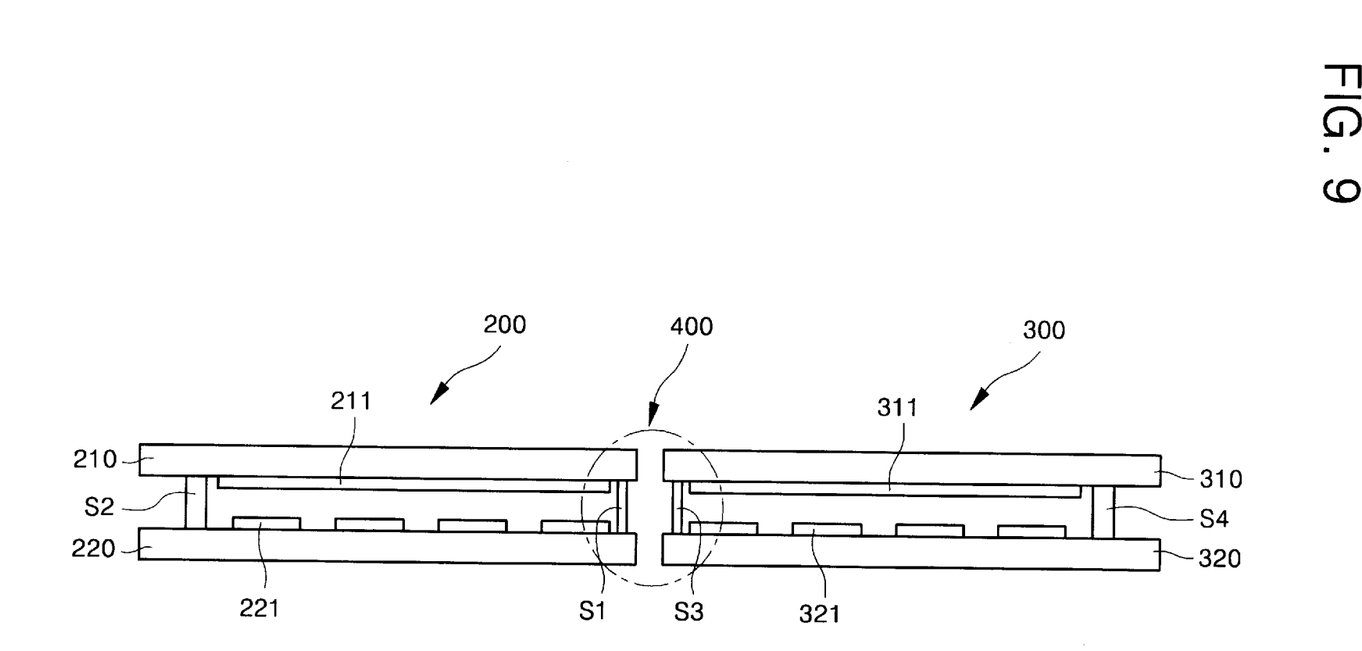
FIG. 9 is a cross-sectional view taken along line IX—IX of FIG. 8.

FIG. 8 is a plan view illustrating a flat panel display device including at least two display panels (ire., multi-panel display device) according to the preferred embodiment of the present invention. FIG. 9 is a cross-sectional view taken along line IX—IX of FIG. 8.

Two display panels 200 and 300 are pushed and contact each other through a joint portion 400 to configure one display screen. The two display panels 200 and 300 have the same configuration as the display panel 100 of FIG. 5, respectively.

The first display panel 200 includes an upper substrate 210 and a lower substrate 220. Two electrodes 211 and 221 are arranged on inner surfaces of the upper substrate 210 and the lower substrate 220. The upper and lower substrates 210 and 220 are sealed by a first sealant SI and a second sealant S2. The first substrate 210 sealant S1 seals edge portions of the first substrate 210 and the second substrate 220 corresponding to the joint portion 400, and the second sealant S2 seals the other edge portions of the first substrate 210 and the second substrate 220.

The second display panel 300 includes an upper substrate 310 and a lower substrate 320. Two electrodes 311 and 321 are arranged on inner surfaces of the upper substrate 310 and the lower substrate 320. The two substrates 310 and 320 are sealed by a third sealant 53 and a fourth sealant S4. The first sealant S3 seals edge portions of the first and second substrate 310 and 320 corresponding to the joint portion 400, and the second sealant S4 seals the rest of the edge portions of the first substrate 310 and the second substrate 320.

The upper and lower substrates 210 and 220 or 310 and 320 have protrusion portions as shown FIG. 6 formed on inner surfaces thereof.

As shown in FIGS. 8 and 9, the protrusion portions of FIG. 6 are formed on portions of the non-display areas 260 and 360 corresponding to the joint portion 400, i.e., on portions of the inner surfaces of the two substrates corresponding to the first sealant S1 and the third sealant S3. In this case, a width of the joint portion 400 becomes small, whereupon one screen display effect can increase. However, the protrusion portions can be formed on the whole area of the non-display areas 260 and 360, i.e., on portions of the inner surfaces of the two substrates corresponding to the second and fourth sealants S2 and S4 as well as the first and third sealants S1 and S3. One screen display effect is achieved and a total display area of the multi-panel display device also can be increased.

In the case that the protrusion portions of FIG. 6 are formed on portions of the non-display areas 260 and 360 corresponding to the joint portion 400, the first and second sealants S1 and S2 of the first display panel 200 have different widths. Likewise, the third and fourth sealants S3 and S4 of the second display panel 300 have different widths. In other words, the first and third sealants S1 and S3 formed on the joint portion 400 are smaller in width than second and fourth sealants S2 and S4.

As described hereinbefore, the flat panel display device has the following advantages. Since a width of the sealant is reduced due to a plurality of protrusion portions, a flat panel display having a wide display area can be achieve without degrading sealant reliability. Since a width of the joint portion of the two display panels is reduced due to a high sealant reliability, the multi-panel display device of increased one screen display effect can be obtained.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A flat panel display device, comprising:
   a display panel having a first substrate and a second substrate facing each other; and
   a sealant sealing the first substrate and the second substrate,
   wherein at least one of the first substrate and the second substrate has at least one protrusion portion formed on an inner surface of the at least one of the first substrate and the second substrate corresponding to the sealant, and the at least one protrusion portion protrudes directly into the sealant.

2. The device of claim 1, wherein the sealant is about 300 μm wide.

3. The device of claim 1, wherein the protrusion portion has a bar-type shape or a dot-type shape.

4. The device of claim 3, wherein a sum of a width of the protrusion portion and a distance between two adjacent protrusion portions is less than 50 μm.

5. The device of claim 1, wherein the protrusion portion on the first substrate is formed facing the protrusion portion on the second substrate.

6. The device of claim 1, wherein the protrusion portion on the first substrate is formed at a location corresponding to a gap between two adjacent protrusion portions on the second substrate.

7. A flat panel display device, comprising:
   a plurality of display panels each including a first substrate and a second substrate facing each other, and a sealant sealing the first substrate and the second substrate,
   wherein the two adjacent display panels contact each other at a joint portion, and at least one of the first substrate and the second substrate of each of the adjacent display panels has at least one protrusion portion formed on an inner surface of the at least one of the first substrate and the second substrate to adhere to the sealant, and the at least one protrusion portion protrudes directly into the sealant.

8. The device of claim 7, wherein the protrusion portion is formed at a location corresponding to the joint portion.

9. The device of claim 7, wherein the sealant is 300 μm wide.

10. The device of claim 7, wherein the protrusion portion has a bar-type shape or a dot-type shape.

11. The device of claim 10, wherein a sum of a width of the protrusion portion and a distance between two adjacent protrusion portions is less than 50 μm.

12. The device of claim 10, wherein the protrusion portion on the first substrate is formed facing the protrusion portion on the second substrate.

13. The device of claim 10, wherein the protrusion portion on the first substrate is formed at a location corresponding to a gap between two adjacent protrusion portions on the second substrate.

14. A flat panel display device, comprising:
   a plurality of dis lay panels, at least two adjacent display panels of the plurality of display panels contacting each other at a joint portion, each of the adjacent display panels including:
   a first substrate a second substrate; and
   a first sealant and second sealant;

wherein:

the first substrate and the second substrate face each other, the first sealant seals portions of the first substrate corresponding to the joint portion and portions of the second substrate corresponding to the joint portion, the second sealant seals remaining portions of the first substrate and the second substrate, and at least one of the first substrate and the second substrate has at least one protrusion portion formed on a portion of an inner surface of the at least one of the first substrate and the second substrate to adhere to the first sealant, and the at least one protrusion portion protrudes directly into the sealant.

15. The device of claim 14, wherein the first sealant is narrower than the second sealant.

16. The device of claim 15, wherein the first sealant is not wider than 300 µm.

17. The device of claim 14, wherein the protrusion portion has a bar-type shape or a dot-type shape.

18. The device of claim 14, wherein a sum of a width of the protrusion portion and a distance between two adjacent protrusion portions is less than 50 µm.

19. The device of claim 14, wherein the protrusion portion on the first substrate is formed facing the protrusion portion on the second substrate.

20. The device of claim 14, wherein the protrusion portion on the first substrate is formed at a location corresponding to a gap between two adjacent protrusion portions on the second substrate.

21. The device of claim 1, wherein the at least one protrusion portion is formed directly on at least one of the first substrate and the second substrate.

22. The device of claim 1, further comprising:

at least one first electrode arranged on the first substrate; and at least one second electrode on the second substrate, wherein the at least one first electrode and the at least one protrusion on the first substrate are formed of a first material and the at least one second electrode and the at least one protrusion on the second substrate are formed of a second material.

23. The device of claim 7, wherein the at least one protrusion portion is formed directly on at least one of the first substrate and the second substrate.

24. The device of claim 14, wherein the at least one protrusion portion is formed directly on at least one of the first substrate and the second substrate.

* * * * *

UNITED STATES PATENT AND TRADEMARK OFFICE
CERTIFICATE OF CORRECTION

PATENT NO. : 6,704,072 B2
DATED : March 9, 2004
INVENTOR(S) : Seok-Hong Jeong et al.

It is certified that error appears in the above-identified patent and that said Letters Patent is hereby corrected as shown below:

Column 6,
Line 62, change "dis lay" to -- display --.

Signed and Sealed this

Fifteenth Day of June, 2004

JON W. DUDAS
*Acting Director of the United States Patent and Trademark Office*